United States Patent
Singh et al.

(10) Patent No.: US 8,249,073 B2
(45) Date of Patent: Aug. 21, 2012

(54) METHOD AND SYSTEM FOR FORWARDING AND SWITCHING OVER PROTECTED PATHS

(75) Inventors: Bijendra Singh, Plano, TX (US); Vibha Chhatwal Sarin, Plano, TX (US); Hong Li, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 231 days.

(21) Appl. No.: 12/731,823

(22) Filed: Mar. 25, 2010

(65) Prior Publication Data
US 2011/0235640 A1 Sep. 29, 2011

(51) Int. Cl.
*H04L 12/28* (2006.01)
*H04L 12/56* (2006.01)
(52) U.S. Cl. .................... 370/392; 370/395.32
(58) Field of Classification Search .......... 370/389, 370/392, 395.3–395.32
See application file for complete search history.

(56) References Cited

U.S. PATENT DOCUMENTS

| 2004/0057430 A1* | 3/2004 | Paavolainen | 370/390 |
| 2009/0135834 A1* | 5/2009 | Guntur | 370/400 |
| 2009/0238089 A1* | 9/2009 | Kitajima | 370/252 |

* cited by examiner

*Primary Examiner* — Ronald Abelson
(74) *Attorney, Agent, or Firm* — Baker Botts L.L.P.

(57) ABSTRACT

In one embodiment, a method for telecommunications includes steps of receiving a first packet through a first port, and determining whether the first packet arrived over a protected path. If the first packet arrived over a protected path, the method also includes the steps of hashing a source address of the first packet, adding a first entry into a forwarding table, and adding a second entry into the forwarding table. The protected path is coupled to at least the first port and a second port. The first entry includes the result of hashing the packet, and an identification of the first port. The second entry includes the result of hashing the packet, and an identification of the second port.

14 Claims, 3 Drawing Sheets

METHOD AND SYSTEM FOR FORWARDING AND SWITCHING OVER PROTECTED PATHS

TECHNICAL FIELD OF THE INVENTION

The present invention relates generally to networked communications and, more particularly, to a method and system for forwarding and switching over protected paths.

BACKGROUND

In telecommunications, a Layer 2 ("L2") switch may use addresses for computers and other networked electronic devices for sending and receiving packets of information. L2 forwarding traditionally follows Institute of Electrical and Electronic Engineers ("IEEE") standards to provide emulated local area network ("ELAN") services using bridging. In L2 bridging, methods such as spanning tree protocol ("STP") may provide a way for the local area network to maintain redundant links while preventing bridge loops. Variations of STP may include rapid spanning tree protocol ("RSTP") or multiple spanning tree protocol ("MSTP"). In such an approach, table entries in an L2 switch forwarding table may be created for various destinations, wherein each entry corresponds to a path to the destination, based on the active links that exist through the network. If the L2 switch receives a packet, it may forward the packet to a destination coupled to the active links, based on the information in the table entries about where the destination is located. If one of the active links goes down, a new path may be calculated for the various addresses based on the existing active links.

However, Ethernet linear protection switching under the G.8031 standard may not follow these IEEE standards. Instead, with G.8031-type protected paths, two possible routes, one active and one backup, are preconfigured. The paths are monitored, and if one of the paths is detected as faulty, the backup path may take over and traffic continues to flow. This action may conflict with the behavior of IEEE bridging schemes. Incorporating G.8031-type protected paths into an IEEE bridging scheme may present significant issues that result in traffic drops and increased network complexity.

SUMMARY

In one embodiment, a method for telecommunications includes steps of receiving a first packet through a first port, and determining whether the first packet arrived over a protected path. If the first packet arrived over a protected path, the method also includes the steps of hashing a source address of the first packet, adding a first entry into a forwarding table, and adding a second entry into the forwarding table. The protected path is coupled to at least the first port and a second port. The first entry includes the result of hashing the packet, and an identification of the first port. The second entry includes the result of hashing the packet, and an identification of the second port.

In another embodiment, an article of manufacture includes a computer readable medium and computer-executable instructions carried on the computer readable medium. The instructions are readable by a processor. The instructions, when read and executed, cause the processor to receive a first packet through a first port, and determine whether the first packet arrived over a protected path. If the first packet arrived over a protected path, the processor is further caused to hash a source address of the first packet, add a first entry into a forwarding table, and add a second entry into the forwarding table. The protected path is coupled to at least the first port and a second port. The first entry includes the result of hashing the packet, and an identification of the first port. The second entry includes the result of hashing the packet, and an identification of the second port.

In yet another embodiment, a switch includes a forwarding table, a first port, a second port, a processor, a computer readable medium, and computer-executable instructions carried on the computer readable medium. The instructions are readable by the processor. The instructions, when read and executed, cause the processor to receive a first packet through the first port, and determine whether the first packet arrived over a protected path. If the first packet arrived over a protected path, the processor is further caused to hash a source address of the first packet, add a first entry into a forwarding table, and add a second entry into the forwarding table. The protected path is coupled to at least the first port and the second port. The first entry includes the result of hashing the packet, and an identification of the first port. The second entry comprising the result of hashing the packet, and an identification of the second port

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
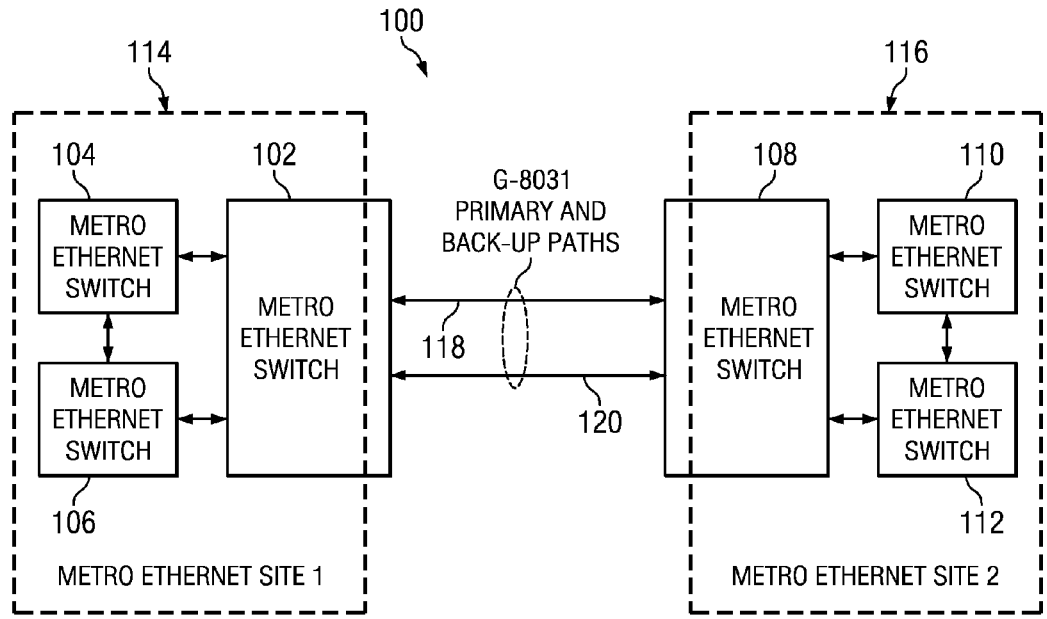
FIG. 1 is an example embodiment of a system for dual-hashing and dual-casting L2 switched and forwarded information over protected paths.

FIG. 1 is an example embodiment of a system 100 for dual-hashing and dual-casting L2 switched and forwarded information over protected paths. System 100 may comprise first metro Ethernet site 114 communicatively coupled to second metro Ethernet site 116. First metro Ethernet site 114 and second metro Ethernet site 116 may comprise an L2 subnetwork, the subnetwork further comprising switching and forwarding entities. First metro Ethernet site 114 and second metro Ethernet site 116 may comprise a pure bridging subnetwork. In one embodiment, first metro Ethernet site 114 may comprise metro Ethernet switches 102-106. In one embodiment, second metro Ethernet site 116 may comprise metro Ethernet switches 108-112. Metro Ethernet sites 114, 116 may comprise any subnetwork suitable for digital communications via an L2 protocol.

In one embodiment, the switching and forwarding entities of metro Ethernet sites 114, 116 may comprise metro Ethernet switches 102-112. In such an embodiment, each of metro Ethernet switches 102-112 may comprise an L2 switch. The metro Ethernet switches in a given metro Ethernet switch site, such as metro Ethernet switches 102-106 in first metro Ethernet site 114, or metro Ethernet switches 108-112 in second metro Ethernet site 116, may be communicatively coupled to each other through ports configured for L2 spanning-tree-protocol communication.

First metro Ethernet site 114 and second metro Ethernet site 116 may communicate using linear protected switching. First metro Ethernet site 114 and second metro Ethernet site 116 may be communicatively coupled through a linearly protected switching connection. The linearly protected switching connection may comprise a protected path. In one embodiment, the protected path may comprise a G.8031 protected path. In a further embodiment, the protected path may comprise a primary path 118 and a backup path 120. First metro Ethernet site 114 and second metro Ethernet site 116 may be communicatively coupled over primary path 118 and a backup path 120 through individual metro Ethernet switches 102, 108. One of paths 118, 120 may be designated as active, wherein a switch monitoring the paths 118, 120 for inbound traffic will accept packets from the active path and simply drop data packets from the other path, but still accept control packets required for the operation of a path protection protocol such as G.8031. In one embodiment, the primary path 118 may be initially configured as the active path. If primary path 118 is down, then backup path 120 may be configured as the active path.

System 100 may be configured to transport digital information between various networked entities in system 100. Within a given metro Ethernet site, such as first metro Ethernet site 114, metro Ethernet switches 102-106 may be configured to transport digital information between metro Ethernet switches 102-106 using an L2 transport protocol. In one embodiment, such an L2 transport protocol may be a spanning tree protocol.

System 100 may be configured to transport digital information between Level 2 subnetworks over a protected path. Metro Ethernet switch 102 may be configured to receive a packet of information from another entity in first metro Ethernet site 114, and forward the information across primary path 118 and secondary path 120 to metro Ethernet switch 108. Metro Ethernet switch 102 may be configured to receive the packet of information from an L2 subnetwork. Metro Ethernet switch 108 may be configured to receive a packet from metro Ethernet switch 102 for delivery to a destination address in or coupled to second metro Ethernet site 116.

Figure 2:
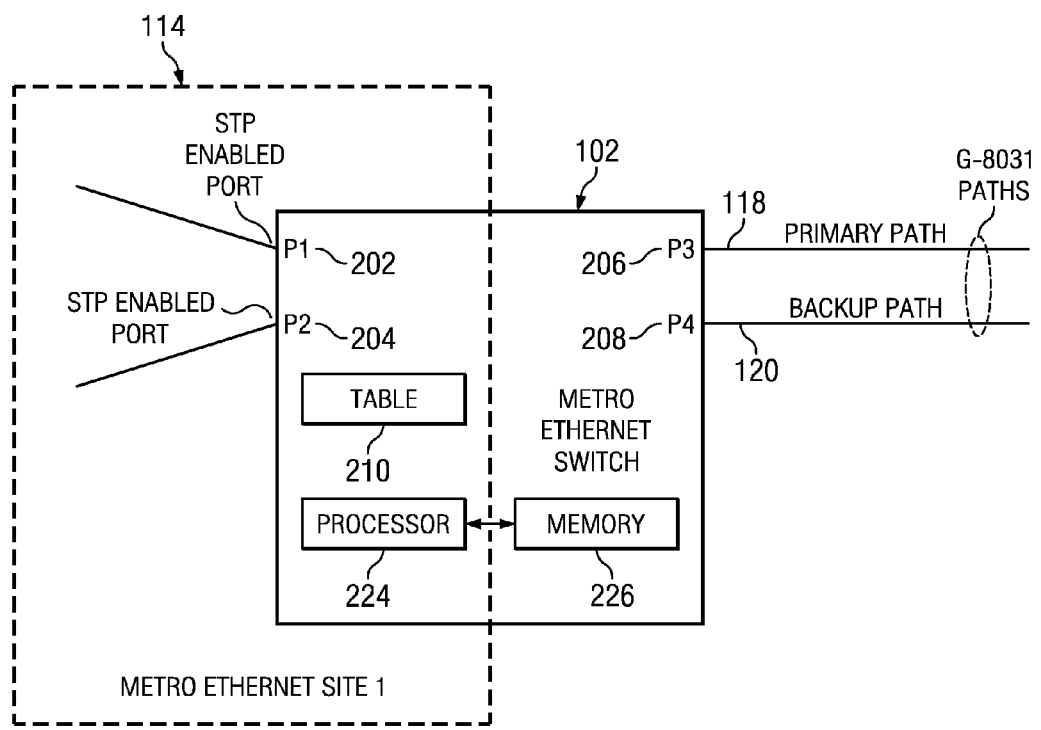
FIG. 2 is a further illustration of an example embodiment of a metro Ethernet switch for dual-hashing and dual-casting L2 switched and forwarded information over protected paths.

FIG. 2 a further illustration of an example embodiment of a metro Ethernet switch 102 for dual-hashing and dual-casting L2 switched and forwarded information over protected paths. Metro Ethernet switch 102 may comprise ports 202, 204, 206, and 208. Ports 202, 204, 206, and 208 may be configured for communication with other metro Ethernet switches. Metro Ethernet switch 102 may comprise a forwarding table 210. Forwarding table 210 may be configured to provide information to metro Ethernet switch 102, including information concerning to what ports should receive a packet to be forwarded to a destination address. Metro Ethernet switch 102 may comprise a processor 224 coupled to a memory 226.

Ports 202 and 204 may be communicatively coupled to other metro Ethernet switches in first metro Ethernet site 114. Ports 202 and 204 may be configured to send or receive information to or from the other metro Ethernet switches.

Ports 206 and 208 may be communicatively coupled to other metro Ethernet switches in second metro Ethernet site 116. Ports 206 and 208 may be communicatively coupled to a primary path and a backup path. The path to which either ports 206 or 208 are communicatively coupled may change depending upon the configuration of metro Ethernet switch 102.

Figure 3:
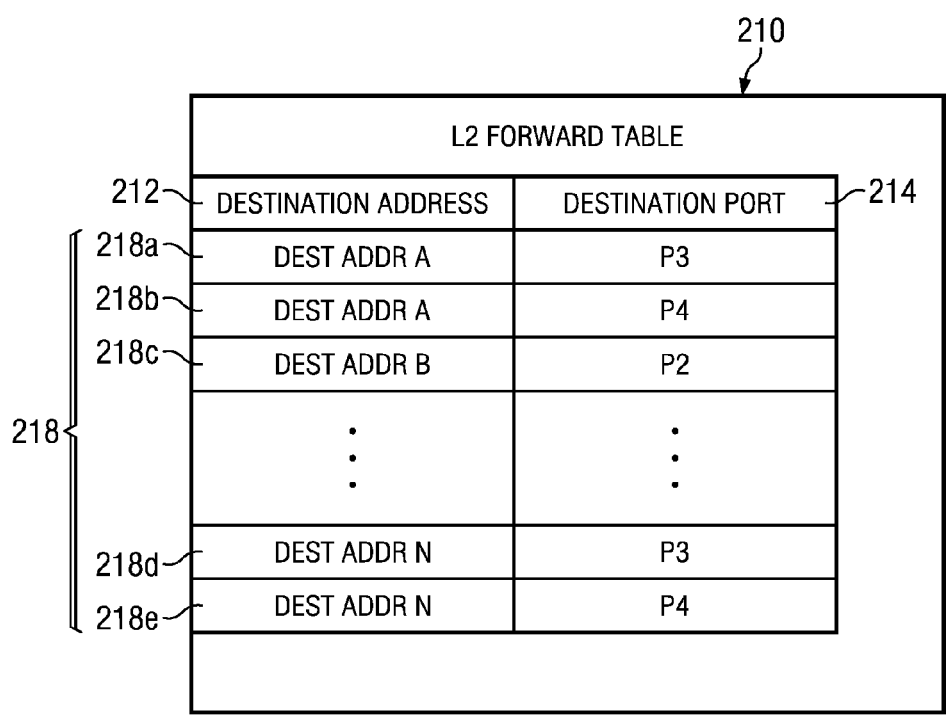
FIG. 3 is a further illustration of an example embodiment of a forwarding table.

FIG. 3 is a further illustration of an example embodiment of a forwarding table 210. Forwarding table 210 may comprise one or more entries 218, each comprising a possible combination of destination address 212 and destination port 214. Destination address 212 may comprise a result of a hashing process applied to a destination address. In one embodiment, destination address 212 may comprise a MAC address. Forwarding table 210 may be configured to be accessible by metro Ethernet switch 102. Forwarding table 210 may be implemented in any suitable manner to provide forwarding information to metro Ethernet switch 102. In one embodiment, forwarding table 210 may reside within metro Ethernet switch 102. For example, forwarding table 210 may reside within memory 226. In another embodiment, forwarding table 210 may reside in another entity, and may be configured to be communicatively accessible to metro Ethernet switch 102. Forwarding table 210 may be implemented in a data structure, record, database, shared library, module, or any other suitable mechanism.

Metro Ethernet switch 102 may be configured to populate forwarding table 120 with entries 218 as metro Ethernet switch 102 receives packets of information through ports 202, 204, 206, 208. Metro Ethernet switch 102 may be configured to learn the association of network addresses and ports from inbound packets through any suitable process. For example, when metro Ethernet switch 102 receives a packet of information to be forwarded, metro Ethernet switch 102 may be configured to examine the contents of the packet to determine the source address of the packet. The source address may comprise an exact address, and/or an address of an intermediate network entity that may have forwarded the packet to metro Ethernet switch 102.

Metro Ethernet switch 102 may be configured to search for an address in forwarding table 210. Forwarding table 210 may be configured to store information about a network location at an index in forwarding table 210 corresponding to the result of a process hashing the address of the network location. In one embodiment, metro Ethernet switch 102 may be configured to search for the address by applying a hashing process to the address, and subsequently accessing the forwarding table 210 at an index corresponding to the results of the hashing process. Metro Ethernet switch 102 may be configured to search for the address in forwarding table 210 by any suitable method to determine whether the address or an a representation of the address is contained within forwarding table 210.

Metro Ethernet switch 102 may be configured to apply a hashing process to the source address. Any suitable hashing process may be used to simplify or speed up the ability of Metro Ethernet switch 102 to look up an address in forwarding table 210, such as a polynomial hashing process, a perfect hashing process, or a universal hashing process. Metro Ethernet switch 102 may be configured to apply the same hashing process to populate and to reference forwarding table 210. Metro Ethernet switch 102 may be configured to use result of applying the hashing process to a source address as the index for an entry in forwarding table 210, using the field for destination address 212. In one embodiment, metro Ethernet switch may be configured to utilize dual-hashing, wherein two hash functions may be used to generate two indices based upon the same or similar inputs to the hash functions, thereby reducing the chances of a collision.

Metro Ethernet switch 102 may be configured to search for the index in forwarding table 210, and if no entry corresponds to the index, create a new entry 218 for the source address. In the new entry, metro Ethernet switch 102 may be configured to populate the destination address 212 with the index corresponding to the result of hashing the source address. Metro Ethernet switch 102 may be configured to populate the destination port 214 with the port through which the packet arrived.

previously unknown source address arrived over a non-protected path, metro Ethernet switch 102 may be configured to create a new entry 218 in forwarding table 210, populating destination address 212 with the result of hashing the source address and populating destination port 214 with the identity of the port through which the packet was received. For example, if a packet with a previously unknown address, Destination B, was received from metro Ethernet switch 106, metro Ethernet switch 102 may be configured to create entry 218c, populate destination address 212 with a hashed result of or source address B, and populate destination port 214 with P2, the port 204 through which the packet arrived. In one embodiment, metro Ethernet switch 102 may be configured to utilize dual-hashing to generate two forwarding table indexes using two hash functions, the hash functions utilizing the source address of the packet as an input to create the new entry 218. In such an embodiment, metro Ethernet switch 102 may be configured to create the new entry 218 in forwarding table 210 at the numerically lower of the two hash indices.

If a packet from a previously unknown source address arrived over a protected path, metro Ethernet switch 102 may be configured to utilize dual-hashing to create two entries 218 in forwarding table. A protected path may comprise two paths, primary path 118 and primary path 120, each coupled to a different port 206, 208. For a packet received on one port of a protected path, metro Ethernet switch 102 may be configured to repeat the process of adding and populating a new entry 218 for the other ports associated with the protected path. In one embodiment, utilizing dual-hashing may comprise using two hash functions to generate two hash indices using the source address of the packet as the input. In such an embodiment, metro Ethernet switch 102 may create two entries 218 in forwarding table 210 at both the indices provided by the two hash functions. For example, if metro Ethernet switch 102 receives a packet from a previously unknown source address, Address A, on port 206 from metro Ethernet switch 108, metro Ethernet switch 102 may be configured to create entries 218a and 218b in forwarding table 210. Metro Ethernet switch 102 may be configured to create entry 218a, populate destination address 212 with the result of hashing Address A, and populate destination port 214 with P3, the port 206 through which the packet was received. Metro Ethernet switch 102 may also be configured to create entry 218b, populate destination address 212 with the result of hashing Address A, or the address itself, and populate destination port 214 with P4, the companion port 208 to the port 206 through which the packet was received. Metro Ethernet switch 102 may thus be configured to create two entries 218 in forwarding table 210 for every new packet received on a protected path with two ports 206, 208.

Returning to FIG. 2, Metro Ethernet switch 102 may be configured to receive packets of information that need to be forwarded by metro Ethernet switch 102. Metro Ethernet switch 102 may be configured to utilize a hashing process on the destination address contained within the packet. Any suitable hashing process may be utilized by metro Ethernet switch 102, preferably the hashing process used to populate forwarding table 210. Metro Ethernet switch 102 may be configured to use the result of the hashing process to search forwarding table 210 for one or more entries 218. Metro Ethernet switch 102 may be configured to access forwarding table 210 for entries 218 with a destination address 212 corresponding to the hashing result, or the destination address itself to determine the destination port 214 of a given destination address of a packet.

If a packet arrives at metro Ethernet switch 102 to be forwarded over a non-protected path, metro Ethernet switch 102 may be configured to transmit the packet over the path comprising the protected path. If one result for a given destination address 212 is found, metro Ethernet switch 102 may be configured to cast the packet to the destination address by forwarding the packet to the destination port 214 associated with the destination address 212. For example, if metro Ethernet switch 102 receives a packet with a destination address B, metro Ethernet switch 102 may be configured to hash the destination address B, use the result to look up entry 218c, determine that the destination port is P2, corresponding to port 204, and forward the packet to the network entity coupled to port 204; in this case, that entity may be metro Ethernet switch 106. In one embodiment, metro Ethernet switch 106 may be configured to utilize dual hashing to look up entry 218c. Metro Ethernet switch 106 may be configured to likewise process the received packet according to its own forwarding table.

If a packet arrives at metro Ethernet switch 102 to be forwarded over a protected path, metro Ethernet switch 102 may be configured to cast the packet over each of the paths comprising the protected path. Metro Ethernet switch 102 may determine whether a packet is to be forwarded over a protected path by any suitable method. In one embodiment, metro Ethernet switch may be configured to determine that a packet is to be forwarded over a protected path if more than one result for a given destination address 212 of the received packet is found in forwarding table 210. In such an embodiment, the forwarding table may be configurable to be searched using two indices provided by the application of two hash functions. In a further embodiment, metro Ethernet switch may be configured to determine that a packet is to be forwarded over a protected path if, assuming multiple results for a given address 212 are found, if the multiple results comprise different destination ports 214. Over a protected path, metro Ethernet switch 102 may be configured to dual-cast the packet to the destination address by forwarding the packet to all the destination ports 214 associated with the destination address. For example, if metro Ethernet switch 102 received a packet with a destination address A, metro Ethernet switch 102 may be configured to apply two hash functions to destination address A and look up the results in forwarding table 210, and obtain search results identifying entries 218a and 218b as associated with destination address A. Metro Ethernet switch 102 may be configured to a second hash function to destination address A and look up the result in forwarding table 210, and obtain the search results identifying one or more entries as associated with destination address A. Metro Ethernet switch 102 may be further configured to determine that entries 218a and 218b comprise destination ports 214 P3 and P4, which correspond to the ports 206, 208. Metro Ethernet switch 102 may thus be configured to determine that the packet is to be sent over a protected path, such as paths 118, 120, the protected path coupled to ports 206, 208. Metro Ethernet switch may thus be configured to cast a copy of the packet to each port for transport over paths 118, 120.

Metro Ethernet switch 102 may comprise any system, device, or apparatus configured to dual-hash and dual-cast packets of information in a telecommunications network. Metro Ethernet switch 102 may comprise a processor 224 coupled to a memory 226. Processor 224 may comprise, for example, a microprocessor, microcontroller, digital signal processor (DSP), application specific integrated circuit (ASIC), or any other digital or analog circuitry configured to interpret and/or execute program instructions and/or process data. Metro Ethernet switch 102 may interpret and/or execute program instructions and/or process data stored in memory 226. Memory 226 may comprise any system, device, or apparatus configured to hold and/or house one or more memory modules. Each memory module may include any system, device or apparatus configured to retain program instructions and/or data for a period of time (e.g., computer-readable media).

In operation, metro Ethernet switch 102 may receive a packet of information. The packet may be received from any network source; for example, other metro Ethernet switches 104, 106, 108, or a network source coupled to metro Ethernet switches 104, 106, 108. The packet may comprise a source address. Metro Ethernet switch 102 may examine the source address to determine whether the metro Ethernet switch 102 has learned and stored the source address in forwarding table 210. Metro Ethernet switch 102 may apply a dual-hashing process to source address, and search for the results in forwarding table 210. In one embodiment, metro Ethernet switch 102 may apply a dual-hashing process to the source address, and search for the result in forwarding table 210. If the source address is not found in forwarding table 210, then metro Ethernet switch 102 may create an entry 218 corresponding to the source address and the port on which it was received. If two hash functions were used to generate entry 218, the entry 218 may be placed at the numerically lower index of the two indices provided by the hash functions.

If metro Ethernet switch 102 received the packet on a non-protected path, then an entry 218 may be created for the source address and the port on which it was received. In one embodiment, an entry may be created at the lower of the two indices provided by the hash functions used to generate the hash. For example, if metro Ethernet switch 102 received a packet from metro Ethernet switch 106 on port 204 with a previously unknown source address B, metro Ethernet switch 102 may create entry 218c and populate the entry with the hashing process result for destination address A, or the address itself, in address field 212, and populate the entry's field for destination port 214 with P2, corresponding to port 204.

If metro Ethernet switch 102 received the packet on a protected path, then using dual-hashing an entry 218 may be created for the source address and all ports related to the protected path from which it was received. For example, if metro Ethernet switch 102 received a packet from metro Ethernet switch 108 on port 208 with a previously unknown source Address A, metro Ethernet switch 102 may create entries 218a and 218b. Entries 218a and 218b may be populated with the result of hashing Address A in the field for destination address 212. The field for destination port 214 in entry 218b may be populated with P4, corresponding to the port 208 over which the packet was received. The field for destination port 214 in entry 218a may be populated with P3, corresponding to another port 206 coupled to the same protected path 118, 120 as port 208.

Metro Ethernet switch 102 may receive a packet of information to be forwarded to another network entity. The packet may be received from any network source; for example, other metro Ethernet switches 104, 106, or a network source coupled to metro Ethernet switches 104, 106. The packet may be received on port 202 or 204. The packet may comprise a network destination such as one of metro Ethernet switches 104-112, or to a network destination coupled to one of metro Ethernet switches 104-112. The destination address and corresponding ports for the packet received by metro Ethernet switch 102 may have been learned by metro Ethernet switch 102 and stored in forwarding table 210. The address may be associated with one or more entries 218 in forwarding table 210. Metro Ethernet switch 102 may look up the hashing process result of a destination address, or the destination address itself, from the received packet in forwarding table 210 to determine through which destination port or ports the packets should be sent. Metro Ethernet switch 102 may utilize indices from a dual-hashing method used to generate the forwarding table indices to search forwarding table 210 to determine the destination port or ports.

If metro Ethernet switch 102 is to forward the packet to a destination within the same metro Ethernet site, such as first metro Ethernet site 114, then metro Ethernet switch 102 may use L2 forwarding or switching to send the packet to the metro Ethernet switch over a non-protected path. Forwarding table 210 may be searched using the hash results generated from two hash functions in a dual-hashing method. For example, metro Ethernet switch 102 may apply a hash process to a received packet's destination address, search for the hashing result or destination address in forwarding table 210, and determine that the packet corresponds to a single entry 218c with a destination address B. In one embodiment, metro Ethernet switch 102 may apply two hashing processes and search at both indices corresponding to the results of the hashing processes. Destination address B may correspond to a network entity coupled to metro Ethernet switch 106, located in first metro Ethernet site 114. The associated destination port P2 may be identified in forwarding table 210, and metro Ethernet switch 102 may thus send the packet of information to its destination via port 204.

If metro Ethernet switch 102 is to forward the packet to a destination across a protected path, such as primary path 118 and backup path 120, then two entries in forwarding table 210 may exist for the destination address. The two entries may comprise different destination ports 214. For example, entries 218a and 218b in forwarding table 210 may indicate two paths to a destination Address A, one through primary path 118 and one through backup path 120. Destination address A may correspond to a network entity coupled to metro Ethernet switch 112 in second metro Ethernet site 116. The destination port field 214 of entry 218a may indicate the port P3 by which a packet with destination address A may be communicated to primary path 118. The destination port field 214 of entry 218b may indicate the port P4 by which a packet with destination address A may be communicated to backup path 120. Thus, forwarding table 210 may comprise two entries 218a, 218b for the same destination address, but with two destination ports, indicating that the packet with Address A is to be forwarded across a protected path.

For Address A, metro Ethernet switch 102 may search forwarding table 210 using the forwarding table indices generated as the results of dual-hashing, the dual-hashing using the destination address as input, to find entries 218a and 218b, which have different destination ports P3 and P4. Metro Ethernet switch 102 may dual cast the packet by sending a copy through primary path 118 coupled to port 206, and one copy through backup path 120 coupled to port 208. Both paths 118, 120 may transmit their respective packets. The data packets on one path, for example, primary path 118, may be received and processed by metro Ethernet switch 108; the data packet travelling on backup path 120 may be ignored by metro Ethernet switch 108. Control packets may continue to be processed by switch 108. In one embodiment, the converse may be true. Metro Ethernet switch 108 monitoring the protected path 118, 120 may receive the packet travelling on the primary path 118. If primary path 118 is down, and as a consequence backup path 120 becomes active, metro Ethernet switch 108 may receive the packet by monitoring backup path 120. The metro Ethernet switch 108 may process the packet it receives from metro Ethernet switch 108, by way of whichever of the paths 118, 120 is active. Metro Ethernet switch 102 may not require knowledge of the status of the paths 118, 120. Consequently, metro Ethernet switch 102 may be capable of forwarding packets over protected and non-protected paths. In addition, in the case where one of paths 118, 120 are down, metro Ethernet switches 104, 106 may not be required to use spanning tree protocol to recompute a different route for a packet to travel to second metro Ethernet site 116.

Figure 4:
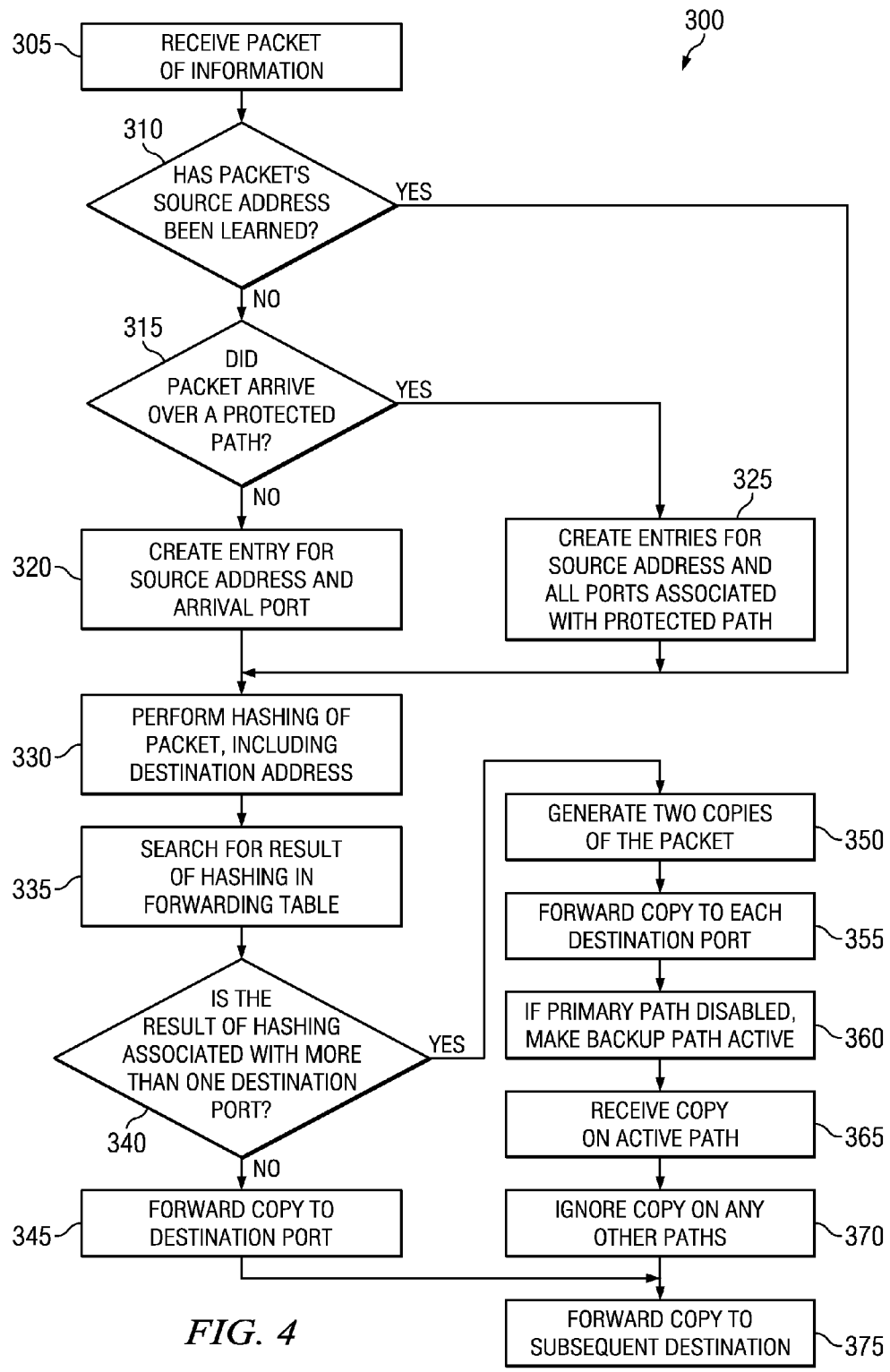
FIG. 4 is a diagram illustrating an example embodiment of a method for dual-hashing L2 switched and forwarded information over protected paths.

FIG. 4 illustrates an example method for dual-hashing and dual-casting L2 switched and forwarded information over protected paths. In step 305, a packet of information may be received. In step 310, it is determined whether the packet's source address has been learned. The packet's source address may be hashed, and the result searched for in a forwarding table. In one embodiment, the source address may be hashed using a dual-hash method. If the hashed results or the address itself is present, then the source address of the packet has already been learned. If the hashed results or the address itself is not present, then the source address has not been learned. If the source address has been learned, then the method may proceed to step 330.

If the source address has not been learned, then in step 315 it may be determined whether or not the packet arrived over a protected path. If the packet did not arrive over a protected path, then in step 320 an entry for the source address may be created, comprising the hashing result, or source address, and a destination port corresponding to the port through which the packet arrived, and the method may proceed to step 330. If the packet did arrive over a protected path, then in step 325 multiple entries for the source address may be created. The first entry may comprise the hashing result, or source address, and a destination port corresponding to the port through which the packet arrived. In one embodiment, the first entry may be created in forwarding table at the index provided by the first hash function of the dual-hashing process, taking a source address as input. The other entries may comprise the hashing result, or a source address, and a destination port corresponding to the other ports to which the protected path is coupled. In one embodiment, a second entry may be created in the forwarding table at the index provided by the second hash function in a dual-hashing method.

In step 330, if the packet is to be forwarded to another network entity, a hashing process may be applied to the packet, including the destination address. In one embodiment, a dual-hashing process may be applied to the packet, taking the destination address as input along with other fields from the packet. The packet may be forwarded to a destination address over any available port. The packet may be forwarded over a non-protected path, or over a protected path. In step 335, the result of the hash, or the destination address, may be searched for in a forwarding table or other suitable entity.

In step 340, it may be determined whether the packet will be forwarded through a protected path. A destination address associated with a single port may indicate that the packet is not to be forwarded over a protected path.

If the packet is not to be forwarded over a protected path, then in step 345, the packet may be forwarded to the appropriate destination port. In one embodiment, step 345 may comprise using an L2 protocol to forward the packet. The packet may be received by the network entity coupled to the port and the method may then proceed to step 375.

If the packet is to be forwarded over a protected path, in step 350, two copies of the packet may be created. In step 355, a copy of the packet may be forwarded to each of the possible destination ports. In one embodiment, a packet may be sent over a primary path, and another packet may be sent over a backup path.

In step 360, if the primary path is disabled, down, malfunctioning, or otherwise not properly transmitting data packets, the backup path may be designated as the active path. In step 365, a copy of the packet is received on an active path. In step 370, any other copies of the packet travelling on other paths may be ignored. In step 375, the packet may be forwarded to a subsequent destination.

Although FIG. 4 discloses a particular number of steps to be taken with respect to an example method 300, method 300 may be executed with more or fewer steps than those depicted in FIG. 4. In addition, although FIG. 4 discloses a certain order of steps to be taken with respect to method 300, the steps comprising method 300 may be completed in any suitable order. For example, step 370 may be conducted at any suitable time during the operation of method 300 such that a packet may be received on an active path in step 375. In another example, steps 380 and 385 may be conducted in parallel. In yet another example, the set of steps 310-325 may be conducted separately, independently, or in parallel from or with the set of steps 330-385. In still yet another example, the functionality of step 330 may be accomplished in step 320 and need not be repeated.

Method 300 may be implemented using the system of FIG. 1, the metro Ethernet switch of FIG. 2, the table of FIG. 3, or any other system, network, or device operable to implement method 300. In certain embodiments, method 300 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A method for telecommunications, comprising the steps of:
receiving a first packet through a first port;
determining whether the first packet arrived over a protected path, the protected path coupled to at least the first port and a second port;
if the first packet arrived over a protected path:
hashing a source address of the first packet;
adding a first entry into a forwarding table, the first entry comprising the source address of the packet, and an identification of the first port; and adding a second entry into the forwarding table, the second entry comprising the source address of the packet, and an identification of the second port;

receiving a second packet through a third port;

if the second packet arrived over a non-protected path:
hashing a source address of the second packet; and
adding a third entry into a forwarding table, the third entry comprising the source address of the second packet and an identification of the third port.

2. The method of claim 1, further comprising the steps of:
receiving a third packet;
hashing a destination address of the third packet;
searching the forwarding table for the destination address of the third packet; and
if the destination address of the third packet is found in the first entry and the second entry of the forwarding table:
determining the first port associated with the first entry;
determining the second port associated with the second entry; and
forwarding a copy of the third packet through each of a first and second ports.

3. The method of claim 2, wherein:
adding a first entry into a forwarding table comprises adding the first entry into the forwarding table at first index corresponding to a result of hashing the source address of the first packet;
adding a second entry into the forwarding table comprises adding the second entry into the forwarding table at second index corresponding to a result of hashing the source address of the first packet; and
searching the forwarding table for the destination address of the third packet comprises utilizing the first index and the second index.

4. The method of claim 1, wherein the protected path comprises a linearly protected Ethernet connection.

5. The method of claim 2, further comprising the steps of:
using a spanning tree protocol, determining a route for the third packet from a network source to a network destination, the route comprising travel through the protected path, the protected path comprising a first communications link and a second communications link, wherein the first communications link is coupled to the first port, and the second communications link is coupled to the second port; and
wherein if first communications becomes inoperable, forwarding the third packet over the protected path without redetermining a route for the third packet from the network source to the network destination.

6. An article of manufacture comprising:
a computer readable medium; and
computer-executable instructions carried on the computer readable medium, the instructions readable by a processor, the instructions, when read and executed, for causing the processor to:
receive a first packet through a first port;
determine whether the first packet arrived over a protected path, the protected path coupled to at least the first port and a second port;
if the first packet arrived over a protected path:
hash a source address of the first packet;
add a first entry into a forwarding table, the first entry comprising the source address of the packet, and an identification of the first port; and
add a second entry into the forwarding table, the second entry comprising the source address of the packet, and an identification of the second port;
receive a second packet through a third port;
if the second packet arrived over a non-protected path:
hash a source address of the second packet; and
add a third entry into a forwarding table, the third entry comprising the source address of the second packet and an identification of the third port.

7. The article of claim 6, wherein the processor is further caused to:
receive a third packet;
hash a destination address of the third packet;
search the forwarding table for the destination address of the third packet; and
if the destination address of the third packet is found in the first entry and the second entry of the forwarding table:
determine the first port associated with the first entry;
determine the second port associated with the second entry; and
forward a copy of the third packet through each of a first and second ports.

8. The article of claim 6, wherein:
causing the processor to add a first entry into a forwarding table comprises causing the processor to add the first entry into the forwarding table at first index corresponding to a result of hashing the source address of the first packet;
causing the processor to add a second entry into the forwarding table comprises causing the processor to add the second entry into the forwarding table at second index corresponding to a result of hashing the source address of the first packet; and
causing the processor to search the forwarding table for the destination address of the third packet comprises causing the processor to utilize the first index and the second index.

9. The article of claim 6, wherein the protected path comprises a linearly protected Ethernet connection.

10. The article of claim 7, wherein the processor is further caused to:
using a spanning tree protocol, determine a route for the third packet from a network source to a network destination, the route comprising travel through the protected path, the protected path comprising a first communications link and a second communications link, wherein the first communications link is coupled to the first port, and the second communications link is coupled to the second port; and
wherein if first communications becomes inoperable, forward the third packet over the protected path without redetermining a route for the third packet from the network source to the network destination.

11. A switch, the switch comprising:
a forwarding table;
a first port;
a second port;
a processor;
a computer readable medium; and
computer-executable instructions carried on the computer readable medium, the instructions readable by the processor, the instructions, when read and executed, for causing the processor to:
receive a first packet through a first port;
determine whether the first packet arrived over a protected path, the protected path coupled to at least the first port and a second port;
if the first packet arrived over a protected path:
hash a source address of the first packet;

add a first entry into a forwarding table, the first entry comprising the source address of the packet, and an identification of the first port; and add a second entry into the forwarding table, the second entry comprising the source address of the packet, and an identification of the second port;

receive a second packet through a third port;

if the second packet arrived over a non-protected path:
hash a source address of the second packet; and
add a third entry into a forwarding table, the third entry comprising the source address of the second packet and an identification of the third port.

12. The switch of claim 11, further comprising causing the processor to:

receive a third packet;

hash a destination address of the third packet;

search the forwarding table for the destination address of the third packet; and if the destination address of the third packet is found in the first entry and the second entry of the forwarding table:
determine the first port associated with the first entry;
determine the second port associated with the second entry; and
forward a copy of the third packet through each of a first and second ports.

13. The switch of claim 11, wherein:

causing the processor to add a first entry into a forwarding table comprises causing the processor to add the first entry into the forwarding table at first index corresponding to a result of hashing the source address of the first packet;

causing the processor to add a second entry into the forwarding table comprises causing the processor to add the second entry into the forwarding table at second index corresponding to a result of hashing the source address of the first packet; and causing the processor to search the forwarding table for the destination address of the third packet comprises causing the processor to utilize the first index and the second index.

14. The switch of claim 12, wherein the protected path comprises a linearly protected Ethernet connection.

* * * * *